United States Patent
Huegerich

(10) Patent No.: US 9,375,988 B2
(45) Date of Patent: Jun. 28, 2016

(54) COUPLING MECHANISM

(71) Applicant: Deere & Company, Moline, IL (US)

(72) Inventor: Tony J. Huegerich, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/520,820

(22) Filed: Oct. 22, 2014

(65) Prior Publication Data

US 2016/0114640 A1    Apr. 28, 2016

(51) Int. Cl.
*B60D 1/64* (2006.01)
*B60D 1/04* (2006.01)
*B60D 1/36* (2006.01)
*A01B 59/00* (2006.01)

(52) U.S. Cl.
CPC ................ *B60D 1/64* (2013.01); *A01B 59/002* (2013.01); *B60D 1/04* (2013.01); *B60D 1/36* (2013.01)

(58) Field of Classification Search
CPC .... A01B 59/006; A01B 59/008; A01B 59/04; A01B 59/042; A01B 59/048; A01B 59/002; B60D 1/64; B60D 1/36
USPC ............... 29/428; 248/653; 280/421
See application file for complete search history.

(56) References Cited

U.S. PATENT DOCUMENTS

| | | | | |
|---|---|---|---|---|
| 2,429,761 | A * | 10/1947 | Ketel | B60D 1/04 280/506 |
| 6,062,321 | A * | 5/2000 | Defrancq | A01B 59/048 172/448 |
| 7,290,977 | B2 | 11/2007 | Albright | |
| 7,717,189 | B2 * | 5/2010 | Shoup | A01B 71/063 172/311 |
| 2012/0068438 | A1 * | 3/2012 | Kollath | A01B 59/067 280/479.3 |
| 2013/0133905 | A1 * | 5/2013 | Valet | A01B 59/002 172/272 |
| 2013/0277943 | A1 | 10/2013 | Wendte | |

FOREIGN PATENT DOCUMENTS

FR      2995756 A1 *  3/2014  .......... A01B 59/062
SE      2676534 B1 *  4/2015  .......... A01D 34/662

* cited by examiner

*Primary Examiner* — Jacob Knutson

(57) ABSTRACT

A coupling mechanism couples a towed implement to a prime mover. The coupling mechanism includes a housing fixed to the prime mover, a coupler frame fixed to the implement, and a coupler plate movably mounted to the coupler frame. A pivot pin projects from the housing. A lever member pivots on the pivot pin. The lever member has a first arm with a latch pin and a second arm with a locking recess. A lock pin projects from the coupler plate, and a latch member is fixed to the coupler frame. The latch member has a latch finger which forms a slot. The latch member engages the latch pin, pivots the lever member and moving the latch pin into the slot as the coupler frame moves towards the housing. The locking recess receives the lock pin as the lever member is pivoted by the latch member.

10 Claims, 7 Drawing Sheets

COUPLING MECHANISM

FIELD

The present disclosure relates to a coupling mechanism for coupling a towed implement to a prime mover.

BACKGROUND

Tractors and utility vehicles used for agricultural work may be coupled to implement which have hydraulic couplers which must be connected to the tractor hydraulic couplers. Implements are not utilized full time with a tractor, so it is desirable that a coupling mechanism allow quick, easy removal and reinstallation of the implement. Flat face hydraulic quick couplers need to be mechanically locked together because of the hydraulic separating forces. Others have used an external locking lever which must be operated manually. An automatic connection mechanism is needed for an implement that can be quickly and easily connected and disconnected from a tractor. A mechanically lock coupling is needed that can reduce the difficulty of securing tractor hydraulic couplers to hydraulic couplers on the implement.

SUMMARY

According to an aspect of the present disclosure, a coupling mechanism couples a towed implement to a prime mover. The coupling mechanism includes a manifold or housing fixed with respect to the prime mover, a coupler frame fixed with respect to the implement, and a coupler plate movably mounted to the coupler frame. A resilient member is coupled between the coupler frame and the coupler plate, and the resilient member is biased to urge the coupler plate towards the housing. The manifold includes prime mover hydraulic couplers. The coupler plate supports implement hydraulic couplers.

A pivot pin projects from a side of the housing. A lever member is pivotally mounted on the pivot pin. The lever member has a hub which rotatably receives the pivot pin, a first arm projecting away from the hub, and a second arm projecting away from the hub. A latch pin projects laterally away from the first arm, and a locking recess is formed by the second arm.

A lock pin projects laterally from the coupler plate. A latch member is fixed to the coupler frame. The latch member has a body, a latch finger spaced apart from the body, and a spacer connecting the latch finger to the body. The body, the finger and the spacer form a slot therebetween. The body forms a slot wall which is spaced apart from the finger and which faces the finger. The body also forms a latch wall which is joined to the slot wall.

The latch wall engages the latch pin, pivots the lever member and moves the latch pin into the slot as the coupler frame moves towards the housing. The second arm moves to a locking position wherein the locking recess receives the lock pin as the lever member is pivoted by the latch member. Gravity moves the first arm towards the latch member and into an uncoupled position when the latch member is spaced apart from the lever member. A stop member may be mounted to the housing and may engage the lever member when the lever member is in the uncoupled position.

DETAILED DESCRIPTION OF THE DRAWINGS

Figure 1:
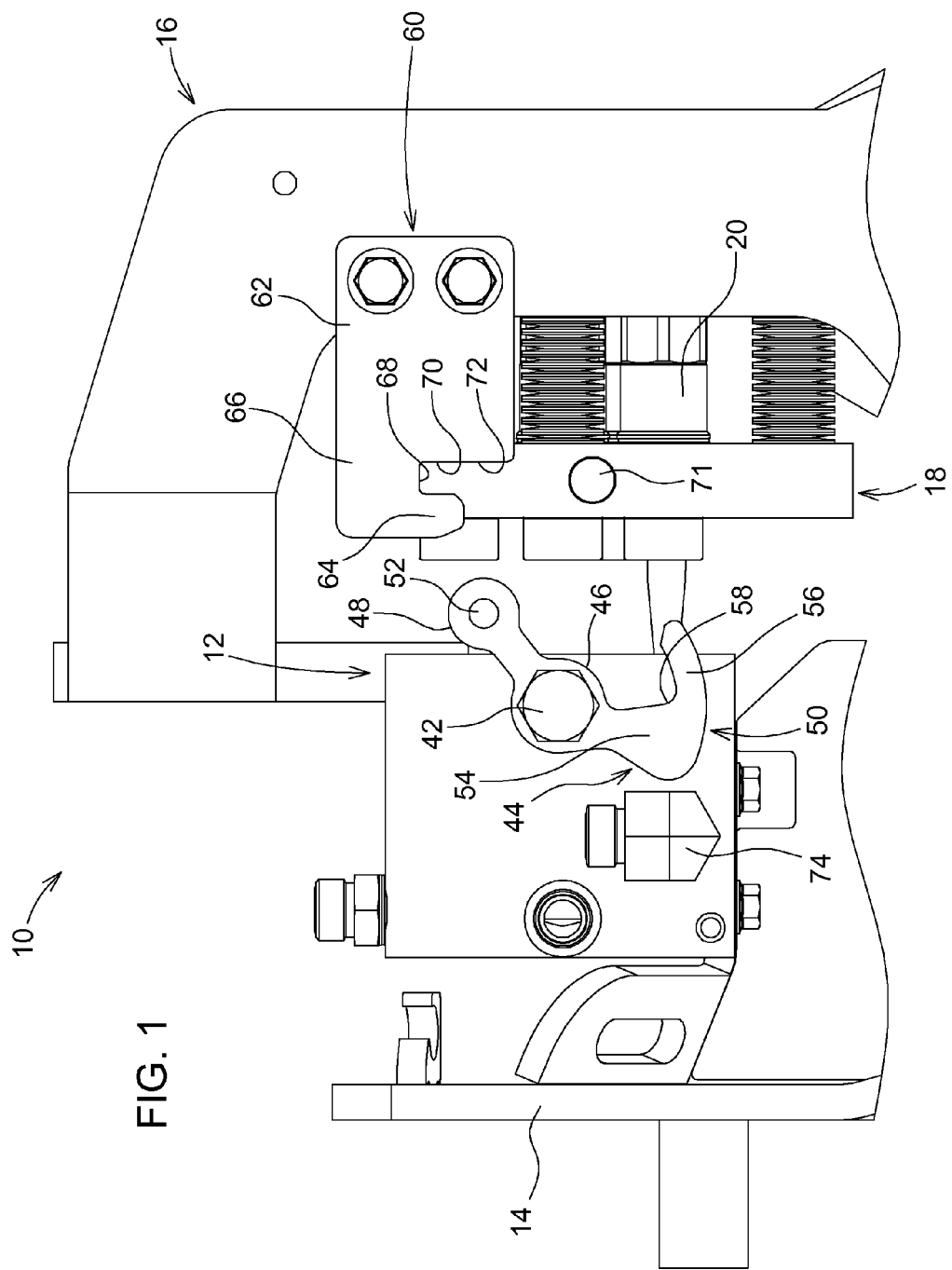
FIG. 1 is a side view of a coupling mechanism embodying the invention.
Figure 2:
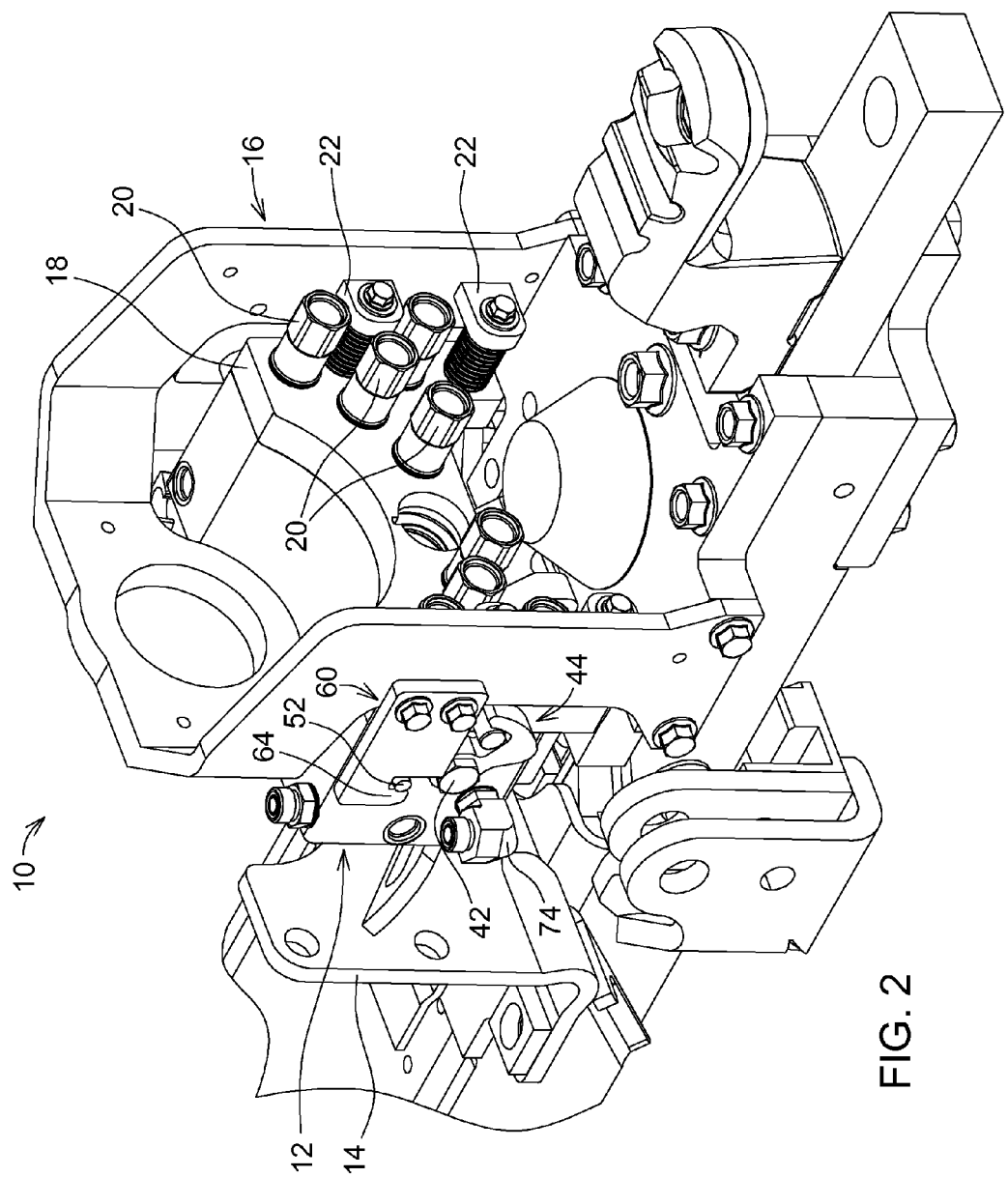
FIG. 2 is a perspective view of the coupling mechanism of FIG. 1.
Figure 3:
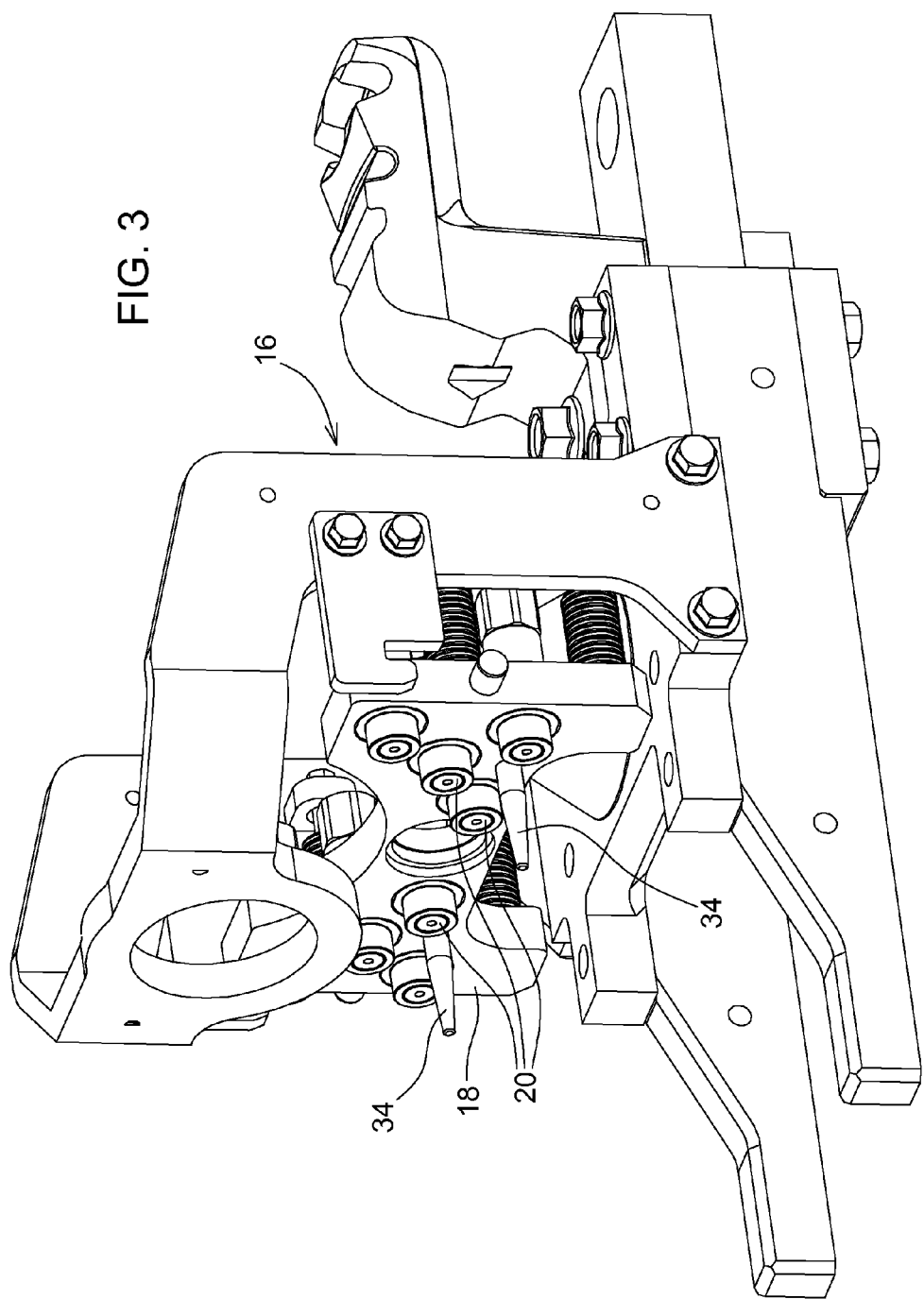
FIG. 3 is a perspective view of the implement coupler portion of FIG. 1.
Figure 4:
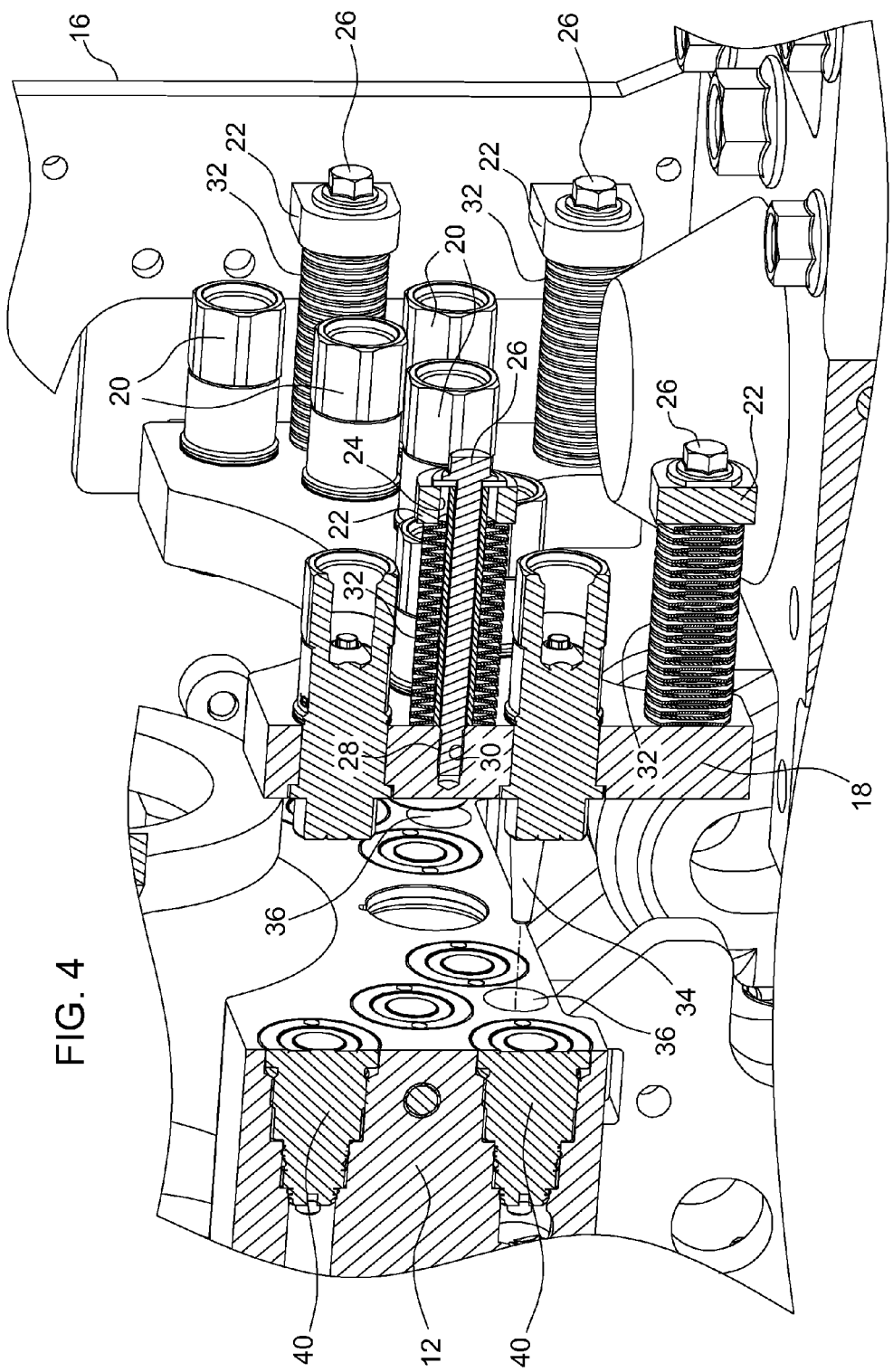
FIG. 4 is a sectional view the coupling mechanism of FIG. 2.
Figure 7:
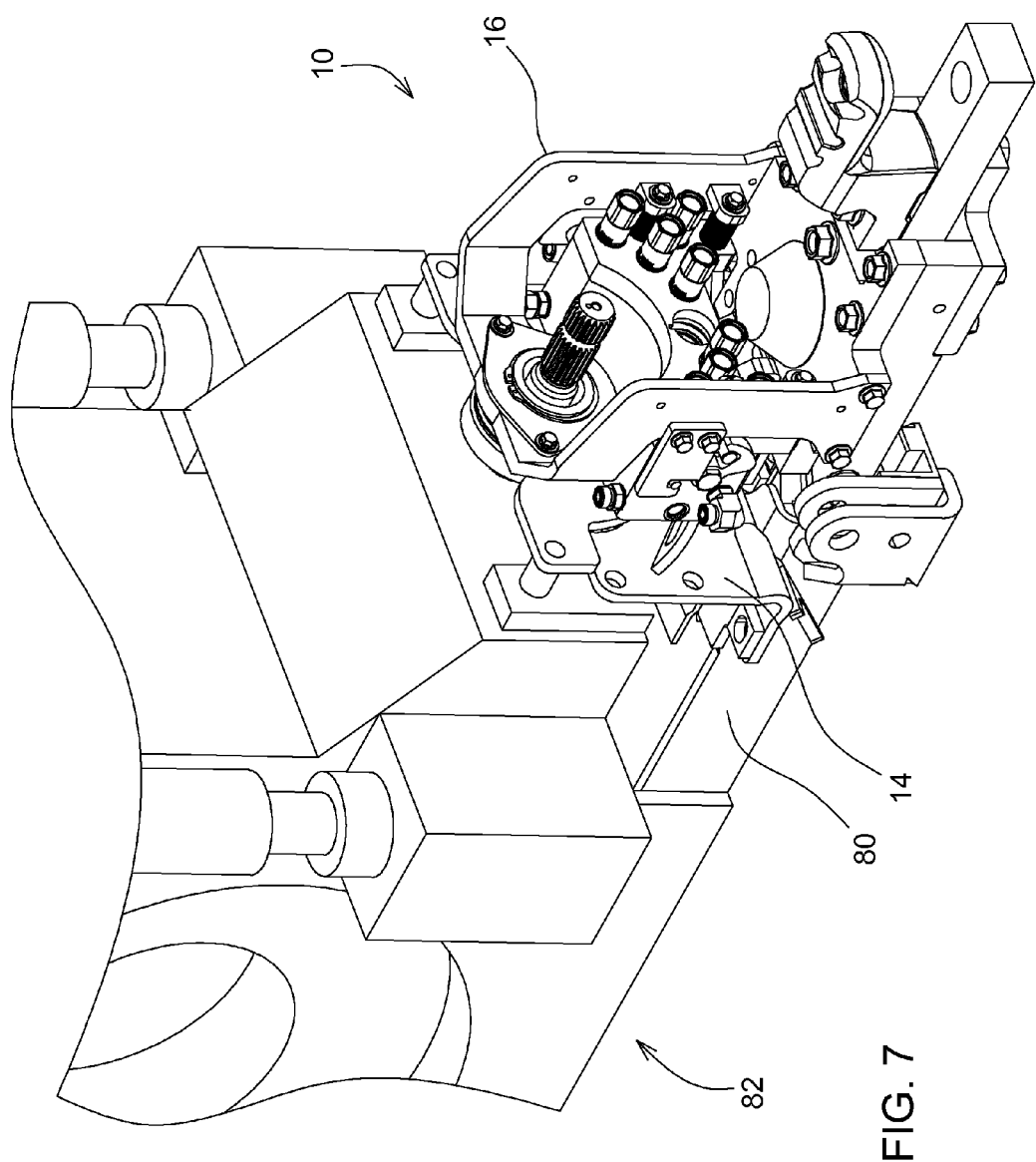
FIG. 7 is a perspective view of the coupling mechanism of FIG. 1 mounted on a pick up hitch.

Referring to FIGS. 1-3, a coupling mechanism 10 is provided for coupling a prime mover, such as a tractor, to an implement towed by the prime mover. A manifold or housing member 12 is mounted to a structure 14 of the tractor. A coupler frame or implement member 16 is fixed to the implement. A couple plate or implement plate 18 is movably supported by the coupler frame 16. One or more hydraulic and/or electric implement couplers 20 are installed in the coupler plate 18. As best seen in FIGS. 2 and 4, support brackets 22 project inwardly from the coupler frame 16. Each bracket 22 has a bore 24 which receives a support bolt 26. Each support bolt has a threaded end 28 which is threadably received by a corresponding threaded bore 30 in the coupler plate 18. A resilient spring member 32 is mounted around each bolt 26, and is biased to urge the coupler plate 18 towards the manifold 12. Alignment dowels 34 project from the coupler plate 18 towards the manifold 12 and are received by alignment bores 36 formed in the manifold. The manifold 12 supports tractor couplers 40 which are matingly engagable with the implement couplers 20. The coupler frame 16 may be pulled towards the manifold 12 by a conventional pick up hitch (FIG. 7).

As best seen in FIG. 1, a pivot pin 42 projects laterally from a side of the manifold or housing 12. A lever member 44 is pivotally mounted on the pivot pin 42. The lever member 42 has a hub 46 which rotatably receives the pivot pin 42, a first arm 48 projecting away from the hub 46, and a second arm 50 projecting away from the hub 46. The lever member 42 also has a latch pin 52 which projects laterally away from an outer end of the first arm 48. The second arm 50 includes a first leg 54 which is joined to the hub 46 and a second leg 56 which extends away from the first leg 54. The legs 54 and 56 are angled with respect to each other to form a locking recess 58.

Also as best seen in FIG. 1, a latch member 60 is fixed, such as by bolts, to the coupler frame 16. The latch member 60 has a body 62, a latch finger 64 spaced apart from the body 62, and a spacer 66 which connects the latch finger 64 to the body 62. The body 62, the finger 64 and the spacer 66 form a slot 68 therebetween. The body 62 forms a slot wall 70 which is spaced apart from the finger 64 and which faces the finger 64. The body 62 also forms a latch wall 72 which is joined to the slot wall 70. A lock pin 71 projecting laterally from the coupler plate 18.

As best seen in FIGS. 1 and 2, a stop member 74 is formed by a hydraulic fitting which attached to the housing member 12 spaced apart from the pivot pin 42. The lever member 44 has an uncoupled position wherein gravity moves the first arm 48 towards the latch member 60 and moves the second arm 50 into engagement with the stop member 74.

As best seen in FIGS. 3 and 4, a pair of guide dowels 34 projects from the coupler plate 18. The manifold 12 includes guide bores 36 which receive the guide dowels 34.

Figure 5:
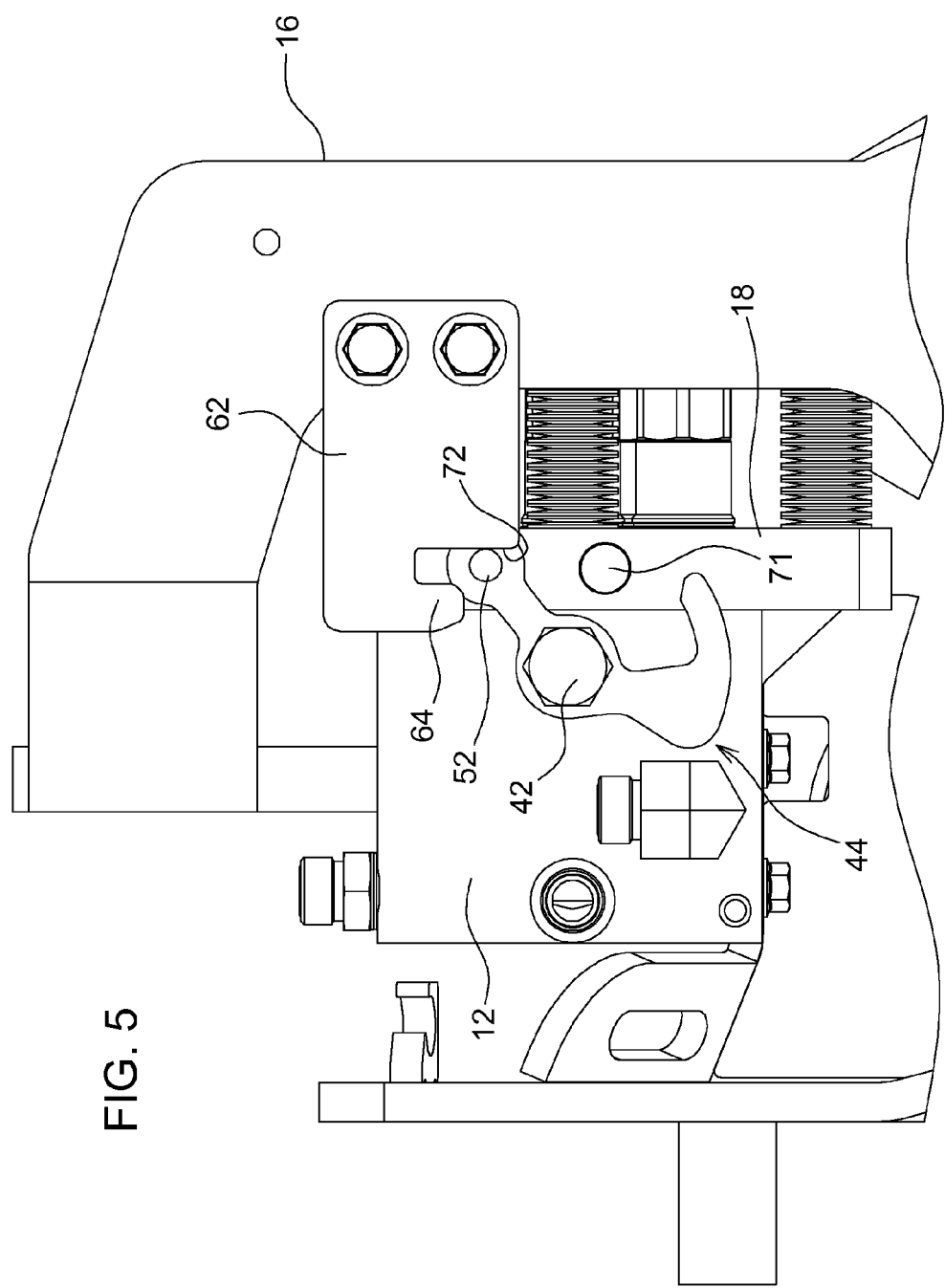
FIG. 5 is a side view of the coupling mechanism of FIG. 1 in an initial coupling condition.
Figure 6:
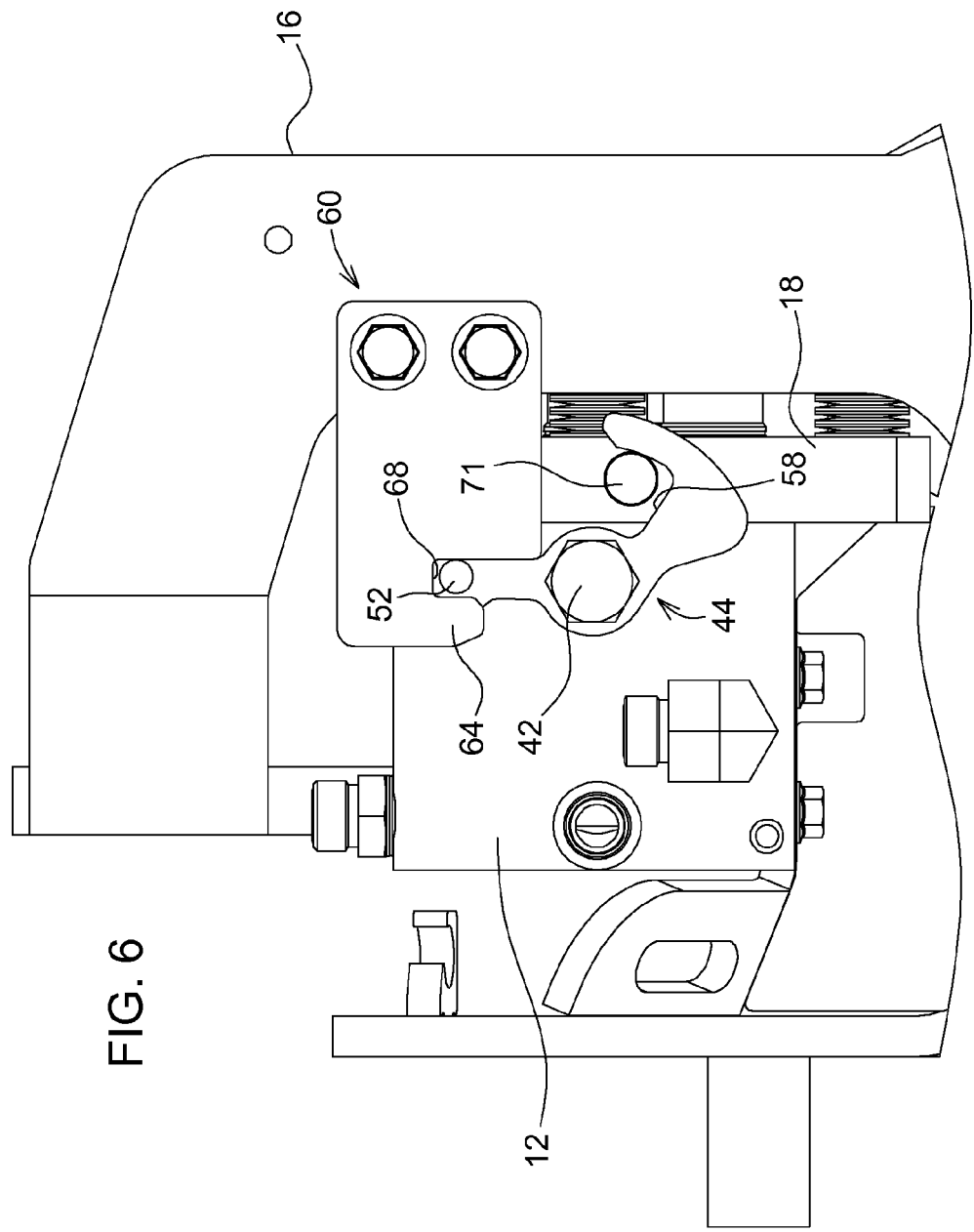
FIG. 6 is a side view of the coupling mechanism of FIG. 1 in a fully coupled condition.

As best seen in FIGS. 5 and 6, the latch wall 72 engages the latch pin 52 and pivots the lever member 44 and moves the latch pin 52 into the slot 68 as the coupler frame 16 moves towards the housing 12. Also, the second arm 50 moves to a locking position wherein the locking recess 58 receives the lock pin 71 as the lever member 44 is pivoted by the latch member 60.

Referring to FIG. 7, a tractor pick up hitch 80 is mounted at the rear of a tractor frame part 82. The pick up hitch 80 supports the coupler mechanism 10 which includes the coupler structure 14 and the coupler frame 16.

The result is a coupling mechanism which can automatically connect and lock flat face hydraulic quick couplers together using a conventional production pick up hitch without leaving the tractor cab. The hydraulic cylinder of a production pick up hitch brings the hydraulic flat face quick couplers together so that the coupling mechanism automatically mechanically locks the couplers together. A plate supports the implement hydraulic couplers facing a manifold which is attached to a frame of the pick up hitch. Springs movably hold the plate to a frame which is fixed to the implement. As the cylinder of the pick up hitch pulls the implement frame to the tractor, the plate contacts the manifold. The cylinder continues to pull the coupler frame towards the tractor, compressing the springs and preventing damage to the hydraulic couplers. The additional coupler frame movement actuates the latching and locking mechanism. The springs also allow for some frame movement without the coupler frames losing contact so the mechanical lock can be released prior to pulling the hydraulic couplers apart.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A coupling mechanism for coupling a towed implement to a prime mover, the coupling mechanism comprising:
   a housing member fixed with respect to the prime mover;
   an implement member mounted to the implement;
   a pivot pin projecting laterally from a side of the housing member;
   a lever member pivotally mounted on the pivot pin, the lever member having a hub which rotatably receives the pivot pin, a first arm projecting away from the hub, a second arm projecting away from the hub, a latch pin projecting laterally away from the first arm, and a locking recess formed by the second arm;
   a lock pin projects laterally and is supported by the implement member;
   a latch member fixed to the implement member, the latch member having a body, a latch finger spaced apart from the body, and a spacer connecting the latch finger to the body; the body, the finger and the spacer forming a slot therebetween, the body forming a slot wall which is spaced apart from the finger and which faces the finger, the body also forming a latch wall which is joined to the slot wall, the latch wall engaging the latch pin, pivoting the lever member and moving the latch pin into the slot as the implement member moves towards the housing member, and the second arm moving to a locking position wherein the locking recess receives the lock pin as the lever member is pivoted by the latch member; and
   a first hydraulic coupler is mounted to the housing member;
   a coupler plate is movably mounted to the implement member;
   a second hydraulic coupler is mounted to the coupler plate, the second hydraulic coupler being coupled to the first hydraulic coupler as the coupler plate moves towards the housing member; and
   a resilient member is coupled between the implement member and the coupler plate, the resilient member being biased to urge the coupler plate towards the housing member;
   wherein the lock pin projects laterally from the coupler plate.

2. The coupling mechanism of claim 1, wherein:
   gravity moves the first arm towards the latch member and into an uncoupled position when the latch member is spaced apart from the lever member.

3. The coupling mechanism of claim 1, wherein:
   a stop member is mounted to the housing member; and
   the lever member having an uncoupled position wherein gravity moves the first arm towards the latch member and moves the second arm into engagement with the stop member.

4. The coupling mechanism of claim 1, wherein:
   a guide dowel projects from one of the housing member and the implement member; and
   the other of the housing member and the implement member includes a guide bore which receives the guide dowel.

5. A coupling mechanism for coupling a towed implement to a prime mover, the coupling mechanism comprising:
   a housing fixed with respect to the prime mover;
   a coupler frame fixed with respect to the implement;
   a coupler plate movably mounted to the coupler frame;
   a resilient member is coupled between the coupler frame and the coupler plate, the resilient member being biased to urge the coupler plate towards the housing;
   a pivot pin projecting laterally from a side of the housing;
   a lever member pivotally mounted on the pivot pin, the lever member having a hub which rotatably receives the pivot pin, a first arm projecting away from the hub, a second arm projecting away from the hub, a latch pin projecting laterally away from the first arm, and a locking recess formed by the second arm;
   a lock pin projects laterally from the coupler plate; and
   a latch member fixed to the coupler frame, the latch member having a body, a latch finger spaced apart from the body, and a spacer connecting the latch finger to the body; the body, the finger and the spacer forming a slot therebetween, the body forming a slot wall which is spaced apart from the finger and which faces the finger, the body also forming a latch wall which is joined to the slot wall, the latch wall engaging the latch pin, pivoting the lever member and moving the latch pin into the slot as the coupler frame moves towards the housing, and the second arm moving to a locking position wherein the locking recess receives the lock pin as the lever member is pivoted by the latch member.

6. The coupling mechanism of claim 5, wherein:
gravity moves the first arm towards the latch member and into an uncoupled position when the latch member is spaced apart from the lever member.

7. The coupling mechanism of claim 5, wherein:
a stop member is mounted to the housing; and
the lever member having an uncoupled position wherein gravity moves the first arm towards the latch member and moves the second arm into engagement with the stop member.

8. The coupling mechanism of claim 5, wherein:
a first hydraulic coupler is mounted to the housing; and
a second hydraulic coupler is mounted to the coupler frame, the second hydraulic coupler being coupled to the first hydraulic coupler as the coupler frame moves towards the housing.

9. The coupling mechanism of claim 5, wherein:
a first hydraulic coupler is mounted to the housing;
a second hydraulic coupler is mounted to the coupler plate, the second hydraulic coupler being coupled to the first hydraulic coupler as the coupler plate moves towards the housing.

10. The coupling mechanism of claim 5, wherein:
a guide dowel projects from the coupler plate; and
the housing includes a guide bore which receives the guide dowel.

\* \* \* \* \*